(12) United States Patent
Linder

(10) Patent No.: US 6,173,072 B1
(45) Date of Patent: Jan. 9, 2001

(54) METHOD AND SYSTEM FOR SELECTIVE RENDERING OF COLOR SPACE DATA

(75) Inventor: Stephen F. Linder, Fairport, NY (US)

(73) Assignee: Xerox Corporation, Stamford, CT (US)

(*) Notice: Under 35 U.S.C. 154(b), the term of this patent shall be extended for 0 days.

(21) Appl. No.: 09/070,481

(22) Filed: Apr. 30, 1998

(51) Int. Cl.$^7$ .................................................. G06K 9/00
(52) U.S. Cl. ........................................... 382/162; 382/167
(58) Field of Search .................................. 382/167, 162; 358/518, 519, 520; 345/150, 147, 153, 22

(56) References Cited

U.S. PATENT DOCUMENTS

| | | | |
|---|---|---|---|
| 5,528,261 | * 6/1996 | Holt et al. | 345/150 |
| 5,539,540 | * 7/1996 | Spaulding et al. | 358/518 |
| 5,583,666 | * 12/1996 | Ellson et al. | 358/518 |
| 5,754,682 | * 5/1998 | Katoh | 382/162 |

OTHER PUBLICATIONS

*PostScript Language Reference Manual*, 2nd Edition, Section 4.8, "Color Spaces", pp. 176–200, 1990, Addison–Wesley Publishing Co.

* cited by examiner

Primary Examiner—Yon J. Couso
(74) Attorney, Agent, or Firm—Fay, Sharpe, Fagan, Minnich & McKee, LLP

(57) ABSTRACT

A method and system for processing color space data to be rendered by display device for selective overloading of the color space data when the overloaded data, or the overloading of the data, is compatible with a satisfactory output of display device. If the color space data is compatible, overload processing occurs. If the original color space data is incompatible for overload rendering, the original color space data is passed through without overload processing. The compatibility generally is determined when possible remapping of the color space or the general form and the allowable ranges of values for each channel are the same for the original color space and the overloading color space. If incompatibility is determined, the original color space data is passed through the rendering processes without overloading.

11 Claims, 4 Drawing Sheets

METHOD AND SYSTEM FOR SELECTIVE RENDERING OF COLOR SPACE DATA

The present invention relates to the processing and rendering of job specified image data in a digital color printing or reproduction system.

More specifically, the present invention relates to the processing and rendering of job specified original color space data based upon a determination that the original color space data can be overloaded to convert to a preferred form of color space data. In other words, if the overloading color space is an optimal and compatible color space, overload processing occurs. On the other hand, if a determination is made that overloading of the original color space to a compatible color space cannot be done, the original color space data is not processed and is merely passed through to the display device.

BACKGROUND OF THE PRESENT INVENTION

The variety of distinct publishing systems in computing devices that generate graphics will invariably specify color space data that is not always optimal for a particular printer or display device. The colors of graphical objects produced by such desktop publishing software will vary between different types of display devices. The rendering of job specified color space data into display device color space data will often necessitate assumptions by the display device that can produce unsatisfactory results for the system operator. The subject invention will minimize the problems engendered by such assumptions.

Graphics colors can be described in any variety of color systems or color spaces. Note *PostScript Language Reference Manual*, 2nd edition, Section 4.8, "Color Spaces", pages 176–200, 1990, Addison-Wesley Publishing Co. Most desktop publishing systems will endeavor to specify abstract colors in a device independent way. But the color values that originate from an application generating a source page description language file can be defined in a number of different color spaces. Some color spaces are related to device color representation (gray scale, RGB and CMYK), or can be related to device independent representations, e.g., XYZ, CIELAB. However, some independent color spaces still have a device-bias that will cause generation of unsatisfactory results if merely passed through for display. It is the problem of whether and how to overload such independent but device-biased color spaces that this subject invention addresses.

The conventional rendering facilities of a printing or display system will utilize a set of transformations to convert the input color spaces as specified by the job to a device color space for such systems, in an effort to be adaptable to different input color spaces and achieve consistent color output or intended rendering of the output. It is common to have various pathways through the rendering system with different capabilities, such as a device path or a calibrated path. The device path communicates input device colors and renders them as output device colors. The calibrated path is a more powerful path and generally has more sophisticated processing associated with it than the device path. The calibrated path facilitates calibrating by the system of the input color space to get a more consistent output. The Xerox Intelligent Color™ (pending application Ser. No. 08/664, 297, filed May 19, 1996) rendering system takes advantage of the processing power of a calibrated pathway by forcing the calibrated path through a remapping of some of the originally input color spaces. Color space remapping may also take place in the calibrated path, in order to ensure that it is optimized for a particular output device.

Compatibility between the original color space and the overloading color space of the Xerox Intelligent Color™ rendering system must be ensured in order to avoid serious rendering defects, such as images which are rendered as black.

Accordingly, a first problem with systems that force overloading through a rendering processor exists in the limitation of the printer to require a compatibility between the input original color space and the overloading color space which, of course, limits the adaptability of the printing system.

A second problem is that even though there are some colors, like device colors, that are desirable to process through the calibrated path, there are other colors that are processed on the calibrated path that are a little more free formed and which should be passed through the rendering system without processing for overloading. In particular, in a Postscript system, CIE based ABC is an abstract color space which, depending on color space parameters, may be used to implement a number of color spaces including CIELAB and other device-biased color spaces. If the original input color space is CIELAB, it is desirable to have such a color space pass through the rendering system. On the other hand, if the input color space is a calibrated RGB space that is set for a particular monitor, that color space is usually desirable for overloading in the rendering system of a printer.

Another problem occurs where a calibrated RGB color space has an incompatible gamma for a selected printer. Unsatisfactory outputs, such as dark prints, might result if calibrated RGB color space with gammas that are incompatible with the rendering system are processed in the usual fashion.

The present invention contemplates a new and improved system and method for rendering a job specified input color space which overcomes the above problems and provides a selective color space overloading system which is readily adaptable to a plurality of original input color spaces and which can provide improved consistency and satisfactory results in displayed or printed graphics outputs.

BRIEF SUMMARY OF THE INVENTION

In accordance with the present invention, there is provided a method for processing color space data to be rendered by a display device having steps of receiving an independent, device-biased color space defining an object to be displayed by the display device; determining if the color space data is compatible for overload rendering; if the color space is compatible, then processing the color space data for generating the overloaded color space data; if the color space data is incompatible for overload rendering, passing the color space data through without overload processing; and, processing the overloaded color space data for generating the display; where if the overloaded color space data is not generated, then processing the original color space data for generating the display on the display device.

In accordance with another aspect of the present invention, one condition of compatibility determining includes identifying if the original color space data falls within a boundary range of a potential overloading color space. If in an allowable range of values, each channel of the original color space data has met a compatibility condition for remapping to a preselected preferred color space. There may be other compatibility conditions defined depending upon the nature of the color spaces involved.

In accordance with another aspect of the present invention, a printing or display system is provided for selectively processing color space data for rendering the job specified original color space into an optimal device color space if the original color space and a device color space are compatible. A color space generator specifies the original color space data. A rendering processor determines if the original color space data is an independent, device-biased color space that is compatible for overloading to generate preferred color space data. If so, the processor overloads the original color space data to form the preferred overloaded color space data. On the other hand, the original color space data is passed through the rendering processor if it is determined that it cannot be overloaded.

One benefit obtained by using the present invention is a rendering processing system, which allows intelligent selection of input color spaces for routing through a calibrated path of a rendering process.

Yet another benefit of the subject invention is that an original color space data can be reestablished after an overloading execution in the rendering system. The present relation of the job specified state across the rendering system provides improved robustness, as the job may make certain assumptions about parameters that it had set previously and preservation of the integrity of the original job environment is desired.

Other benefits and advantages for the subject new method and system will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings, and wherein.

DETAILED DESCRIPTION OF THE INVENTION

Figure 1:
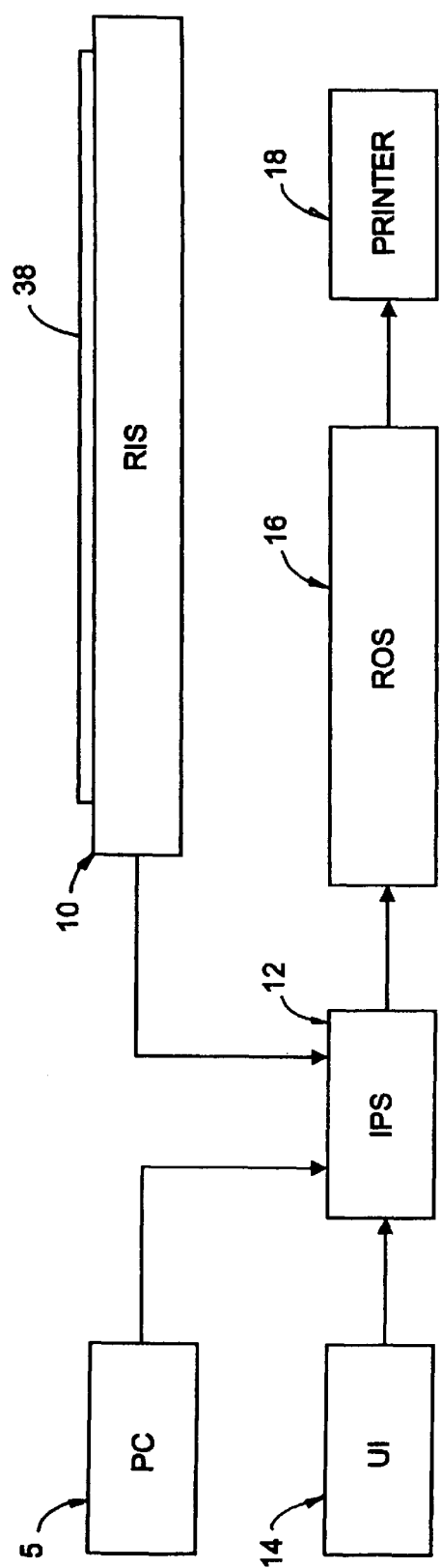
FIG. 1 is a block diagram of a typical xerographic coloring rendering system.

Referring now to the drawings where the showings are for purposes of illustrating preferred embodiments of the invention only and not for purposes of limiting same, the FIGURES show a method and system for selective rendering of color space data wherein the rendering comprises select overloading of original color space data to a preferred form for printing or otherwise displaying, or can merely pass the original color space data through the rendering paths without overloading. In this description, as well as in the drawings, like reference numerals represent like devices, circuits or equivalent circuits which perform the equivalent functions.

The actual rendering process can be carried out in conjunction with a variety of devices, such as laser xerography, inkjet, etc. and may further be applicable to electronic display devices. For the sake of brevity, a laser xerographic printing system will be described below with respect to the present invention, though the invention is not dependent on any particular display device (e.g., a printer or copier) and can be implemented in any of several systems.

FIG. 1 is a schematic elevational view of a typical electrostatic digital color copier. An ESS (electronic subsystem) or image processing station (both referred to as IPS), indicated generally by the reference numeral 12, contains data processing and controller electronics which prepare and manage the image data flow to a raster output scanner (ROS) indicated generally by the reference numeral 16. A network of one or more personal computers (PC), indicated generally by the reference numeral 5, is shown interfacing with or in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 1), as well as carry out the image rendering selections.

As further shown in FIG. 1, a multiple color original document 38 may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or directly to PC 5.

Documents in digital or other forms may be created, screened, modified, stored and/or otherwise processed by PC 5 prior to transmission/relay to IPS 12 for printing on printer 18. The display of PC 5 may show electronic documents on a screen (not shown in FIG. 1). IPS 12 may include the processor(s) and controller(s) (not shown in FIG. 1) required to perform the adaptive image rendering system of the present invention.

IPS 12 also may transmit signals corresponding to the desired electronic or scanned image to ROS 16, which creates the output copy image. The ROS will expose the photo conductive belt to record the latent images which correspond to the signals transmitted from IPS 12. One latent image is developed with cyan developer material. Another latent image is developed with magenta developer material, and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 1, printer or marking engine 18 is an electrophotographic printing machine.

As noted above, rendering systems in printers will employ color space remapping of original inputted color spaces to force a rendering through a path that is hopefully optimized for a particular printer. Xerox Intelligent Color™ noted above is one such system.

Figure 2:
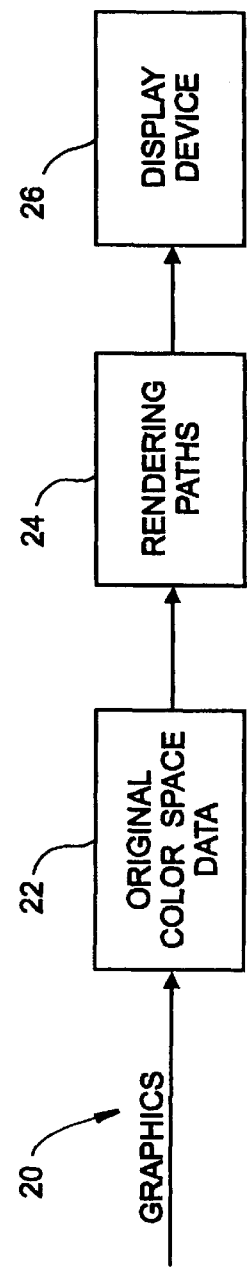
FIG. 2 is a block diagram illustrating a system for rendering original input color space data according to the concepts of the present invention.

With reference to FIG. 2, the originally input color space data or graphics 20 input by the scanner 16 are received in a printer receiving block 22 and communicated to a rendering path circuit 24. In a conventional system, the rendering path circuit 24 will include both a device path and a calibrated path. The Xerox Intelligent Color system takes advantage of the processing power of the calibrated path and in some cases forces the original color space data through the calibrated path for a remapping of color spaces. Such remapping is intended to obtain optimized rendering for a particular output device. Unfortunately, compatibility must be maintained between the original color space and the overloading color space in order to avoid serious rendering defects occurring as a result of the remapping.

Independent color spaces, even those with a device-bias (e.g.,SMPTE RGB, NTSC RGB and SRGB which define monitor standards) were usually passed through the rendering paths 24 without remapping. Incompatibility between device-biased color spaces and the rendering system may result in unsatisfactory rendering such as dark renditions. An example of incompatibility is significant gamma mismatch between the device-biased color space and the rendering system.

Figure 3:
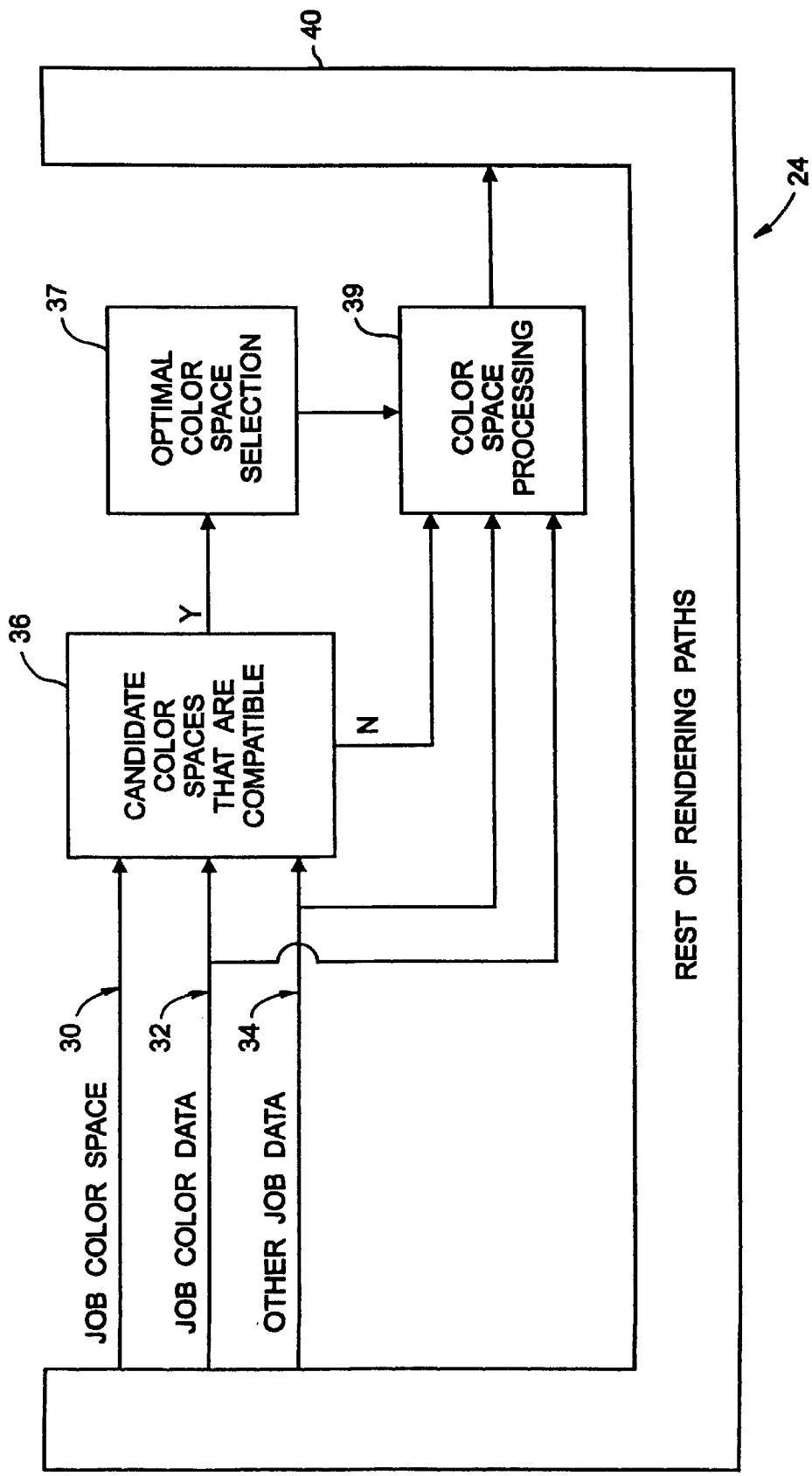
FIG. 3 is a detail of a portion of the rendering paths block of FIG. 2.

With particular reference to FIG. 3, the rendering paths circuit is more particularly identified as comprising a portion that can identify the job specified color space as one that is susceptible for overloading in accordance with the present invention.

More particularly, the job data specified in the original color spaces comprised of the job color space 30, job color data 32 and other job data 34 (e.g., an object type). The system will then determine if the job color space 30 is susceptible for overloading to one or more candidate color spaces as indicated by block 36. If one or more candidate color space are determined, then the optimal color spaces selected at block 37 is selected for overload processing at block 39. The processed overloaded color data is outputted from processing block 39 for communication through the rest of the system along with the rest of the rendering paths 40.

It is a feature of subject invention that a method and system are provided to automatically retain the original color space data if an appropriate overloading of color space does not exist or cannot be generated by the rendering path circuit 24. Thus, if there are no candidate color spaces at block 36, then the job color space 30 is passed through to color space processing 39.

More particularly, the invention is a method and system for ensuring compatibility between the original and the overloading color space. Overloading by the rendering path circuit 24 is only selectively performed if compatibility conditions are the same for the original color space data and the overloading color space data. The display device 26 will then be able to provide more satisfactory results to a job operator.

Figure 4:
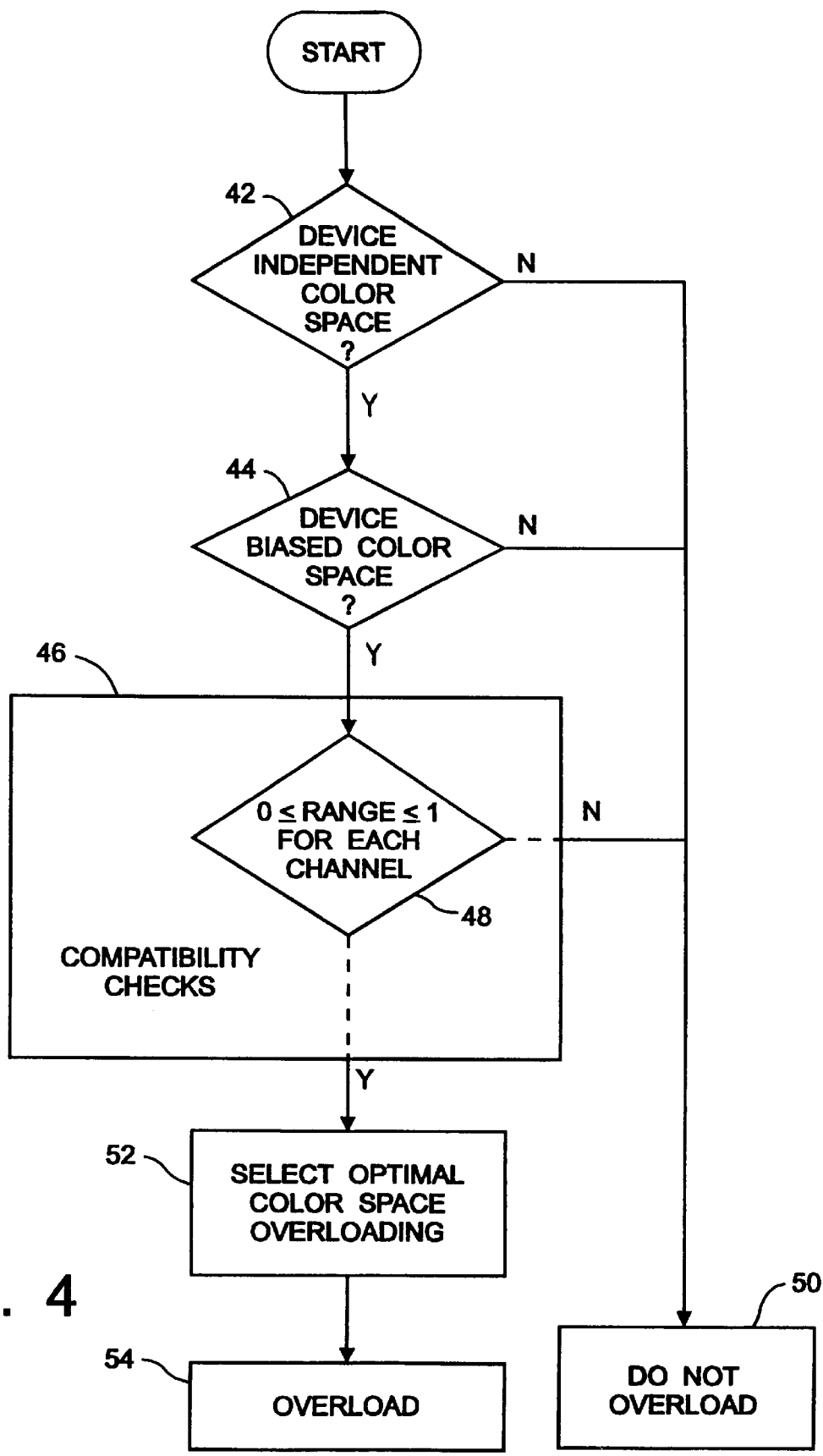
FIG. 4 is a flowchart illustrating a process for rendering a particular input color space data in accordance with the present invention.

FIG. 4 represents one preferred process utilized by the system illustrated in FIG. 2. In this example, a page description language file passed between the PC 5 to the IPS 12 is processed by the rendering path circuit 24 to determine whether the data for each channel of any of a number of the color spaces in the file has a range between 0 and 1. In this particular example, it is assumed there is a compatible color space for overloading with the original color space when it is within this range. More particularly, the method of the invention comprises determining if the job color space is an independent color space 42, which in most prior art systems would have been passed through without overload processing. If so, a check is made if it is also a device-biased color space 44 that is compatible for overload processing. The compatibility checks step 46 may comprise a plurality of checks. The one 48 specifically shown considers whether the data on each channel of the color spaces has a range between 0 and 1. Other potential compatibility checks could include an examination of matrix transformations or other color space parameters, such as gamma. The checks or steps for compatibility can be arranged in different orders.

If the original color space data had been outside of the range at step 48, then the original color space would not have been overloaded through the rendering path 24 and would have been passed through 50 to the display device 26. The ability to pass color space data through the rendering path 24 without overloading, when the original color space is determined to be incompatible with the overloading process of the particular device at hand, is one of the special benefits of the invention.

For some originally inputted color spaces it is fairly clear that overloading can occur. For example, whenever the original color space is a device RGB color space, the rendering path circuit 24 will always overload it into a compatible color space. Similarly, whenever an inputted device is CMYK, it will be overloaded with a particular DEFG color space. Determining when the original input color space is incompatible with overloading when the rendering path 24 may have an uncertainty about a compatibility between the overloaded color space and the printing device, is the more complex determination.

Other steps in FIG. 4 are after compatibility has been found through the checks of step 46, then an optimal color space overloading is selected at step 52 and actual overloading occurs at 54.

TABLE 1

| Case | Is There An Optimal Compatible Color Space | Manual Override | Current State | New State | Action Performed In New State |
|---|---|---|---|---|---|
| 1 | Y | On | N/A | N/A | No action is necessary, since overloading of the original color space is not performed. |
| 2 | N | On | N/A | N/A | No action is necessary, since overloading of the original color space is not performed. |
| 3 | Y | Off | Overloaded, Already Overloaded | Already Overloaded | No action is necessary, the Original color space color space is already overloaded. |

TABLE 1-continued

| Case | Is There An Optimal Compatible Color Space | Manual Override | Current State | New State | Action Performed In New State |
|---|---|---|---|---|---|
| 4 | N | Off | Overloaded, Already Overloaded | Not overloaded | Remove the overloads of the Original color space color space |
| 5 | Y | Off | Already Not Overloaded, Not Overloaded | Overloaded | Overload the Original color space color spaces. |
| 6 | N | Off | Already Not Overloaded, Not Overloaded | Not Overloaded | No action is necessary, since the color space is not currently overloaded. |

Figure 5:
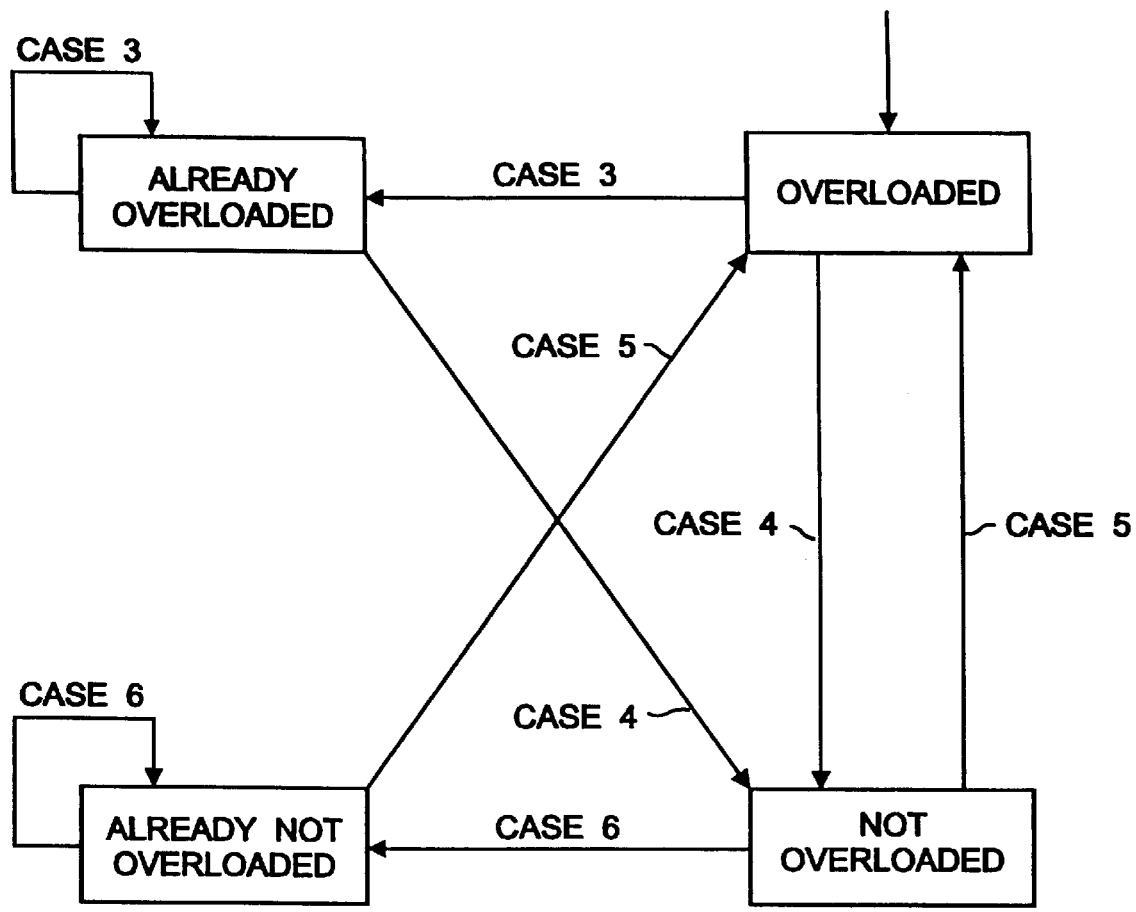
FIG. 5 is a state diagram specifying the possible states of color space data processed in accordance with the present invention, as identified in Table 1 of the specification below.

With reference to Table 1 above and FIG. 5, each time a paint operator is executed, the state control determines a new state based upon the overloaded color space, the state of the manual overrides, and the current state. If necessary, the original color space is reestablished after the paint operator executes. This preservation of the graphic state across the paint operators is necessary for robustness reasons; for example, in printing applications print jobs may make certain assumptions about the color space based upon the color space set in the job itself.

The state control for the selective color space override is shown in Table 1 and FIG. 5. In Table 1, a determination is made as to whether a compatible and optimal color space exists or not. Based on this determination, and the current state there are four allowable states: overloaded (meaning that the original color space is overloaded), already overloaded (meaning the original color space has already been overloaded), not overloaded (meaning the original color space is not overloaded) and already not overloaded (meaning that the color space has been previously not overloaded). Note that actions are only associated with the "overloaded" and the "non-overloaded" states. Enabling the application color space feature deactivates the selective color space overload feature as overloading of Original color space does not occur (see case 1 and 2 in Table 1). A manual override (cases 1 and 2) precludes overloading.

The invention has been described with reference to preferred embodiments. Obviously, modifications and alterations will occur to others upon the reading and understanding of the specification. It is my intention to include all such modifications and alterations as far as they come within the scope of the appended claims or the equivalence thereof.

Having now described my invention, I now claim:

1. A method for processing color space data to be rendered by a display device, comprising the steps of:
   (a) receiving original color space data including independent color space data defining a display by the display device;
   (b) determining if the independent color space data is device-biased color space data;
   (c) determining if the device-biased color space data is compatible for overload rendering by the display device;
   (d) if the independent, device-biased color space data is compatible, processing the original color space data for generating overloaded color space data;
   (d) if the independent, device-biased color space data is incompatible for overload rendering, bypassing the original color space data from overload processing, wherein the original color space data defines the display; and,
   (e) processing the overloaded color space data for generating the display, or if the overloaded color space data is not generated, then processing the original color space data for generating the display on the display device.

2. The method as defined in claim 1 wherein said compatibility determining includes identifying if there are one or more compatible color spaces for the overload rendering.

3. The method as defined in claim 2 wherein the overload processing includes selecting an optimal color space among the one or more compatible color spaces.

4. The method as claimed in claim 1, wherein the compatibility determining includes identifying if the original color space data falls within a boundary range of the overloaded color space data.

5. The method as claimed in claim 4, wherein the identifying comprises assessing if a form and allowable range of values for each channel for the original color space data are compatible for remapping to a preselected preferred color space of the display device.

6. The method as claimed in claim 5 wherein if the original color space data is a CIELAB space data, then determining that the original color space data is incompatible for overload rendering.

7. The method as defined in claim 1 including manually overriding the overload processing for passing the original color space data for generating the display.

8. A printing system for selectively processing color space data for rendering a job specified original color space into an overloaded color space if the original color space is compatible for overloading, comprising:
   a color space generator for specifying an original color space;
   a rendering processor for identifying if the original color space is an independent, device-biased color space that is transformable to a preferred overloaded color space and including means for generating the preferred color space, and means for bypassing the original color space from optimal color space overloading based upon a determination that the original color space cannot be overloaded to a compatible color space; and,
   a display processor for displaying a display comprising the preferred overloaded color space or the original color space.

9. The printing system as defined in claim 8 wherein the rendering processor includes a manual override for precluding the generating of the preferred overloaded color space.

10. The printing system as defined in claim 8 wherein the rendering processor includes means for identifying a plurality of possible compatible overloaded color spaces and means for selecting an optimal one of the plurality for the generating of the preferred color space.

11. The printing system as defined in claim 8 wherein if the original color space is gamma incompatible with a set of potential overloading color spaces, then the rendering processor passes the original color space through without overloading.

* * * * *